United States Patent
Natsumeda et al.

(10) Patent No.: US 12,015,139 B2
(45) Date of Patent: Jun. 18, 2024

(54) NON-AQUEOUS ELECTROLYTE SECONDARY BATTERY

(71) Applicants: SANYO Electric Co., Ltd., Daito (JP); Panasonic Corporation, Kadoma (JP)

(72) Inventors: Syunsuke Natsumeda, Osaka (JP); Takuya Shinomiya, Osaka (JP); Takamitsu Tashita, Tokushima (JP); Fumikazu Mizukoshi, Osaka (JP)

(73) Assignees: PANASONIC ENERGY CO., LTD., Osaka (JP); PANASONIC HOLDINGS CORPORATION, Kadoma (JP)

( * ) Notice: Subject to any disclaimer, the term of this patent is extended or adjusted under 35 U.S.C. 154(b) by 434 days.

(21) Appl. No.: 17/430,362

(22) PCT Filed: Feb. 21, 2020

(86) PCT No.: PCT/JP2020/007024
§ 371 (c)(1),
(2) Date: Aug. 12, 2021

(87) PCT Pub. No.: WO2020/175361
PCT Pub. Date: Sep. 3, 2020

(65) Prior Publication Data
US 2022/0131131 A1 Apr. 28, 2022

(30) Foreign Application Priority Data
Feb. 28, 2019 (JP) ................ 2019-035843

(51) Int. Cl.
H01M 4/133 (2010.01)
H01M 4/02 (2006.01)
(Continued)

(52) U.S. Cl.
CPC ........... *H01M 4/133* (2013.01); *H01M 4/134* (2013.01); *H01M 4/386* (2013.01); *H01M 4/587* (2013.01);
(Continued)

(58) Field of Classification Search
CPC ...... H01M 4/133; H01M 4/134; H01M 4/386; H01M 4/587; H01M 4/483; H01M 4/525;
(Continued)

(56) References Cited

U.S. PATENT DOCUMENTS

| 5,677,082 A | 10/1997 | Greinke et al. |
| 2013/0323601 A1 | 12/2013 | Nishimura et al. |
| 2017/0346080 A1 | 11/2017 | Kano et al. |

FOREIGN PATENT DOCUMENTS

| CN | 103199251 A | 7/2013 |
| CN | 107437614 A | 12/2017 |

(Continued)

OTHER PUBLICATIONS

International Search Report dated May 19, 2020, issued in counterpart application No. PCT/JP2020/007024 (2 pages).
(Continued)

*Primary Examiner* — Matthew W Van Oudenaren
(74) *Attorney, Agent, or Firm* — WHDA, LLP

(57) ABSTRACT

The purpose of the present disclosure is to provide a non-aqueous electrolyte secondary battery having excellent low-temperature properties. A non-aqueous electrolyte secondary battery according to an aspect of the present disclosure comprises a negative electrode having: a negative electrode current collector; and a negative electrode active material layer disposed on the negative electrode current collector, wherein the negative electrode active material layer contains graphite particles A and graphite particles B as a negative electrode active material. The internal porosity
(Continued)

of graphite particles A is 8-20%, and the internal porosity of graphite particles B is 5% or less. When the negative electrode active material layer is bisected in the thickness direction into a negative electrode current collector-side first half region and an outer surface-side second half region, the amount of graphite particles A in the second half region is greater than in the first half region.

4 Claims, 2 Drawing Sheets

(51) Int. Cl.
*H01M 4/134* (2010.01)
*H01M 4/1393* (2010.01)
*H01M 4/36* (2006.01)
*H01M 4/38* (2006.01)
*H01M 4/587* (2010.01)
*H01M 4/62* (2006.01)

(52) U.S. Cl.
CPC ............... *H01M 2004/021* (2013.01); *H01M 2004/027* (2013.01); *H01M 4/1393* (2013.01); *H01M 4/366* (2013.01); *H01M 4/625* (2013.01)

(58) Field of Classification Search
CPC .. H01M 4/364; H01M 4/1393; H01M 4/1395; H01M 4/366; H01M 4/625; H01M 2004/021; H01M 2004/027; H01M 10/0525
See application file for complete search history.

(56) References Cited

FOREIGN PATENT DOCUMENTS

| | | | |
|---|---|---|---|
| JP | 9-320600 | A | 12/1997 |
| JP | 2012-049124 | A | 3/2012 |
| JP | 2014-67638 | A | 4/2014 |
| JP | 2014067638 | * | 4/2014 |
| JP | 2015-133296 | A | 7/2015 |
| JP | 2018-125077 | A | 8/2018 |
| KR | 10-2018-0125312 | A | 11/2018 |
| WO | 2012/144618 | A1 | 10/2012 |

OTHER PUBLICATIONS

English translation of Office Action dated Dec. 27, 2023, issued in counterpart CN Application No. 202080016141.6. (6 pages).

* cited by examiner

NON-AQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery using a carbon material such as graphite as a negative electrode active material, for example, a lithium ion battery, has been recently utilized in a power source for electric vehicles and the like. For example, Patent Literature 1 discloses a non-aqueous electrolyte secondary battery, with, as a carbon material, densified carbon having an internal porosity of 5% or less. Patent Literature 2 discloses a non-aqueous electrolyte secondary battery with, as a carbon material, a mixture of a carbon material A having an internal porosity of 1% or more and less than 23% and a carbon material B having an internal porosity of 23% to 40%.

CITATION LIST

Patent Literature

PATENT LITERATURE 1: Japanese Unexamined Patent Application Publication No. Hei 9-320600
PATENT LITERATURE 2: Japanese Unexamined Patent Application Publication No. 2014-67638

SUMMARY

Technical Problem

When a non-aqueous electrolyte secondary battery is used under a low-temperature environment, for example, the viscosity of an electrolyte is increased to result in a reduction in lithium ion mobility, thereby causing, for example, an increase in resistance and a reduction in capacity due to such an increase in resistance to occur. It is an advantage of the present disclosure to provide a non-aqueous electrolyte secondary battery that can be suppressed in an increase in resistance under a low-temperature environment and that is excellent in low-temperature characteristics.

Solution to Problem

A non-aqueous electrolyte secondary battery of one aspect of the present disclosure comprises a negative electrode including a negative electrode current collector and a negative electrode active material layer disposed on the negative electrode current collector, the negative electrode active material layer includes graphite particles A and graphite particles B each as a negative electrode active material, the graphite particles A have an internal porosity of 8% to 20% and the graphite particles B have an internal porosity of 5% or less, and the graphite particles A are more included in a half second region on an outer surface side than in a half first region on a negative electrode current collector side in the case of bisection of the negative electrode active material layer in a thickness direction.

Advantageous Effects of Invention

According to the non-aqueous electrolyte secondary battery according to the present disclosure, an increase in resistance under a low-temperature environment is suppressed. Thus, the non-aqueous electrolyte secondary battery according to the present disclosure is excellent in low-temperature characteristics.

DESCRIPTION OF EMBODIMENTS

Figure 1:
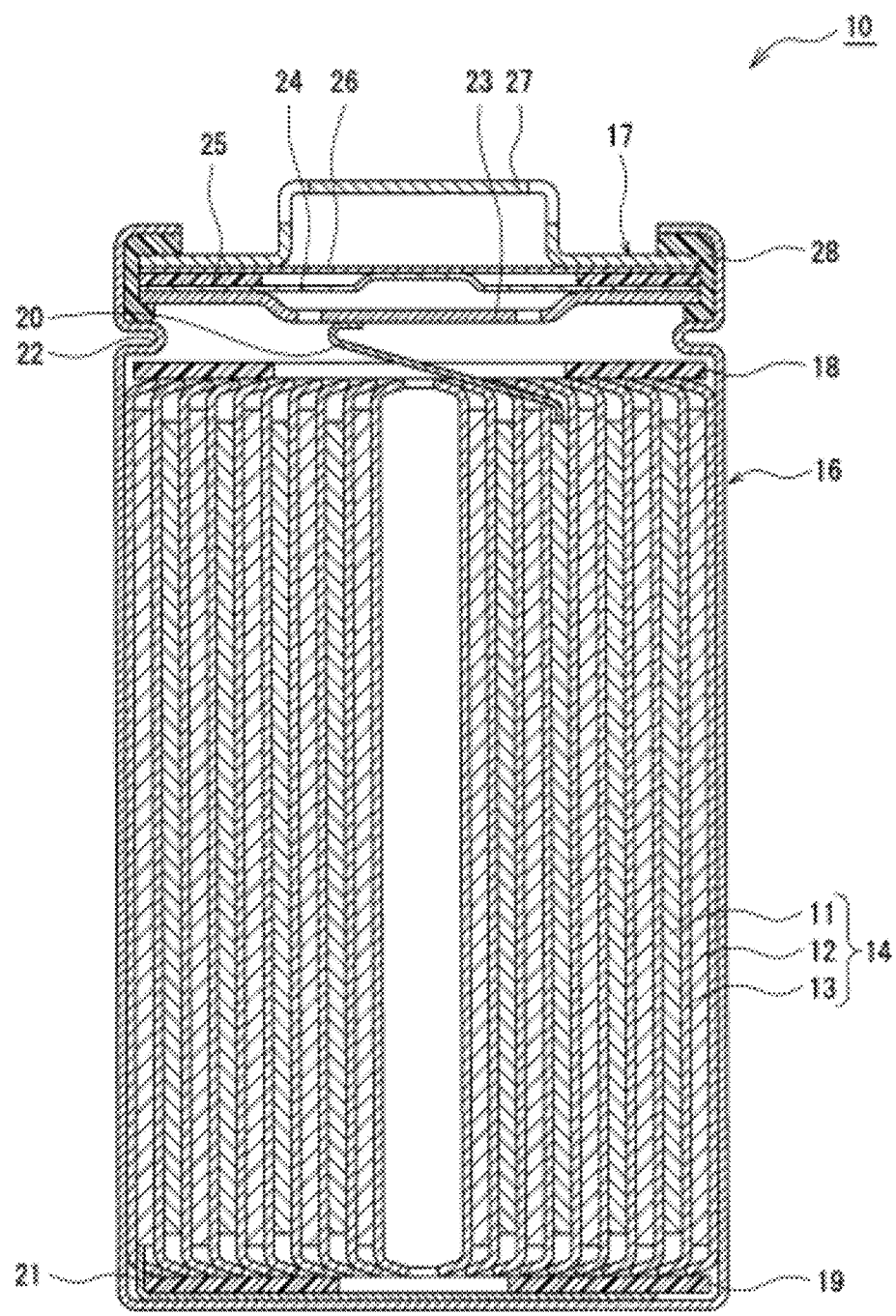
FIG. 1 is a sectional view of a non-aqueous electrolyte secondary battery of an exemplary embodiment.

As described above, an important object is to suppress an increase in resistance of a non-aqueous electrolyte secondary battery under a low-temperature environment and suppress, for example, deterioration in output characteristics and reductions in charge capacity and discharge capacity due to such an increase in resistance. The present inventors have made intensive studies in order to achieve the object, and as a result, have found that graphite particles A having an internal porosity of 8% to 20% are more present in a half second region on an outer surface side than in a half first region on a negative electrode current collector side in a negative electrode active material layer, resulting in suppression of an increase in resistance under a low-temperature environment and an enhancement in low-temperature characteristics. Graphite particles B having an internal porosity of 5% or less are preferably more included in the first region than in the second region in the negative electrode active material layer.

The graphite particles A are larger in specific surface area than graphite particles having a lower internal porosity. Thus, the graphite particles A can be used to thereby allow a negative electrode to be suppressed in deterioration in reactivity. On the other hand, the graphite particles A more easily rupture upon compression of a negative electrode than graphite particles having a lower internal porosity, and are reduced in sizes of pores between particles and decreased in diffusion path of an electrolyte in a region including a large number of the graphite particles A. Thus, the conductivity of lithium ions under a low-temperature environment is remarkably reduced in the first region in the negative electrode active material layer, where an electrolyte is hardly permeated. In other words, the content of the graphite particles A in the first region in the negative electrode active material layer can be decreased, resulting in an increase in size of pores in the negative electrode active material layer and an increase in diffusion path of an electrolyte.

According to the non-aqueous electrolyte secondary battery according to the present disclosure, the graphite particles A are more present in the second region than in the first region in the negative electrode active material layer, namely, the content rate of the graphite particles A is lower in the first region than in the second region. This enables not only suppression of deterioration in reactivity on a negative electrode surface even under a low-temperature environment, but also an increase in diffusion path of an electrolyte in the first region. Accordingly, the non-aqueous electrolyte secondary battery according to the present disclosure has excellent low-temperature characteristics.

Hereinafter, an exemplary embodiment will be described in detail with reference to drawings. The non-aqueous electrolyte secondary battery of the present disclosure is not limited to embodiments described below. The drawings referred to in the description of embodiments are schematically illustrated.

FIG. 1 is a sectional view of a non-aqueous electrolyte secondary battery of an exemplary embodiment. A non-aqueous electrolyte secondary battery 10 shown in FIG. 1 comprises a wound-type electrode assembly 14 formed by winding a positive electrode 11 and a negative electrode 12 with a separator 13 being interposed therebetween, a non-aqueous electrolyte, insulating plates 18 and 19 respectively disposed on and under the electrode assembly 14, and an exterior can 16 that houses such members. The exterior can 16 is a cylindrical metal container having a closed-end, and the opening thereof is sealed by a sealing assembly 17. Another form of electrode assembly, for example, a stacked electrode assembly formed by stacking alternately a positive electrode and a negative electrode with a separator being interposed therebetween may be here applied instead of the wound-type electrode assembly 14. A battery case may be, for example, a rectangular, coin-shaped, or button-shaped metal exterior can, or a pouch exterior body formed by laminating a resin sheet and a metal sheet.

The exterior can 16 is a cylindrical metal container having a closed-end, as described above. A gasket 28 is disposed between the exterior can 16 and the sealing assembly 17 to ensure that the interior of the battery is tightly sealed. The exterior can 16 includes, for example, a grooved portion 22 which has a portion of a lateral surface projected inward and which supports the sealing assembly 17. The grooved portion 22 is preferably formed annularly along the circumferential direction of the exterior can 16, and the upper surface thereof supports the sealing assembly 17.

The sealing assembly 17 has a structure in which an internal terminal plate 23, a lower vent member 24, an insulating member 25, an upper vent member 26, and a cap 27 are stacked in the listed order sequentially from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at respective middle portions and the insulating member 25 is interposed between respective circumferences. If the internal pressure of the non-aqueous electrolyte secondary battery 10 increases by heat generation due to, for example, internal short, the lower vent member 24 changes its shape in such a way as to, for example, push up the upper vent member 26 toward the cap 27, and thus ruptures, thereby breaking the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a though-hole in the insulating plate 18 and extends toward the sealing assembly 17, and a negative electrode lead 21 attached to the negative electrode 12 passes on the outside of the insulating plate 19 and extends toward the bottom of the exterior can 16. The positive electrode lead 20 is connected to the lower surface of the internal terminal plate 23, which is the bottom board of the sealing assembly 17, by welding or the like, and the cap 27, which is the top board of the sealing assembly 17 and electrically connected to the internal terminal plate 23, serves as a positive electrode terminal. The negative electrode lead 21 is connected to the inner surface of the bottom of the exterior can 16 by welding or the like, and the exterior can 16 serves as a negative electrode terminal.

Hereinafter, each component of the non-aqueous electrolyte secondary battery 10 will be described in detail.

[Negative Electrode]

Figure 2:
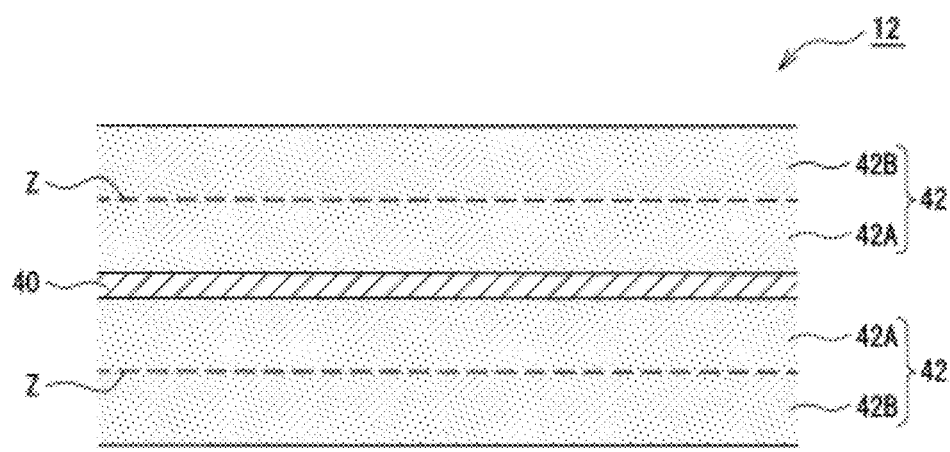
FIG. 2 is a sectional view of a negative electrode of an exemplary embodiment.

FIG. 2 is a sectional view of a negative electrode of an exemplary embodiment. The negative electrode 12 includes a negative electrode current collector 40 and a negative electrode active material layer 42 disposed on a surface of the negative electrode current collector 40. The negative electrode active material layer 42 is preferably disposed on each of both surfaces of the negative electrode current collector 40.

The negative electrode current collector 40 here used is, for example, foil of a metal, such as copper, which is stable in the electric potential range of the negative electrode, or a film in which such a metal is disposed on an outer layer.

The negative electrode active material layer 42 includes graphite particles as a negative electrode active material. The negative electrode active material layer 42 preferably includes, for example, a binder. The negative electrode 12 can be produced by, for example, preparing a negative electrode mixture slurry including a negative electrode active material, a binder, and the like, coating the negative electrode current collector 40 with the negative electrode mixture slurry and drying the resultant to thereby form the negative electrode active material layer 42, and rolling the negative electrode active material layer 42. The detail of the method for producing the negative electrode active material layer 42 will be described below.

Figure 3:
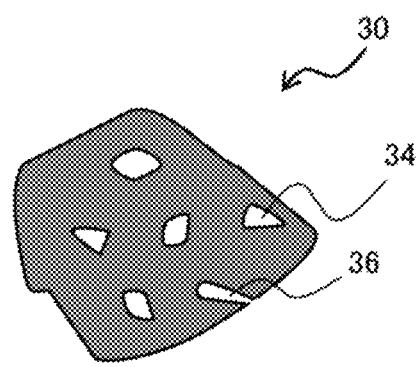
FIG. 3 is a sectional view of a graphite particle in a negative electrode active material layer.

FIG. 3 is a sectional view of a graphite particle in a negative electrode active material layer. As shown in FIG. 3, a graphite particle 30 has closed pores 34 (hereinafter, internal pores 34) not linked from the internal of the particle to the surface of the particle and pores 36 (hereinafter, external pores 36) linked from the internal of the particle to the surface of the particle, when the cross section of the graphite particle 30 is viewed.

The median size (hereinafter, designated as "D50") on a volume basis of the graphite particles 30 is, for example, 5 μm to 30 μm, and is preferably 10 μm to 25 μm. D50 can be measured with water as a dispersion medium by use of a laser diffraction particle size distribution measurement apparatus (for example, LA950 manufactured by HORIBA Ltd.). D50 means a particle size at an accumulation of 50% from a smaller particle size in a particle size distribution on a volume basis.

Such graphite particles 30 in the present embodiment include graphite particles A having an internal porosity of 8% to 20% and graphite particles B having an internal porosity of 5% or less. The graphite particles A may have an internal porosity of 8% to 20%, preferably 10% to 18%, more preferably 12% to 16%, in view of, for example, suppression of an increase in resistance under a low-temperature environment. The graphite particles B may have an internal porosity of 5% or less, preferably 1% to 5%, more preferably 3% to 5%, in view of, for example, suppression of an increase in resistance under a low-temperature environment. Such respective internal porosities of the graphite particles are two dimensional values each determined from the percentage of the area of the internal pores 34 of the graphite particle to the cross sectional area of the graphite particle. Such respective internal porosities of the graphite particles are each determined by the following procedure.

<Method for Measuring Internal Porosity>

(1) The cross section of the negative electrode active material layer is exposed. Examples of the method for exposing the cross section include a method involving cutting out a portion of the negative electrode and processing the resultant with an ion milling apparatus (for example, IM4000PLUS manufactured by Hitachi High-Tech Corporation) to expose the cross section of the negative electrode active material layer.

(2) A reflection electron image of the cross section exposed of the negative electrode active material layer is taken with a scanning electron microscope. The magnification in taking of the reflection electron image is from 3000× to 5000×.

(3) The cross section image obtained as described above is imported into a computer and binarized with image analysis software (for example, ImageJ manufactured by National Institutes of Health), thereby obtaining an image binarized, in which the cross section of each particle in the cross section image is converted into a black image and any pore present in the cross section of such each particle is converted into a white image.

(4) Any graphite particles A and B each having a particle size of 5 µm to 50 µm are selected in the image binarized, and the area of the cross section of each of the graphite particles, and the area of each of the internal pores present in the cross section of each of the graphite particles are calculated. The area of the cross section of each of the graphite particles here refers to the area of the region surrounded by the circumference of each of the graphite particles, namely, the area of the entire cross section part of such each of the graphite particles. Any pore having a width of 3 µm or less, among pores present in the cross sections of the graphite particles, may sometimes have a difficulty in determining whether such any pore is an internal pore or an external pore in image analysis, and thus such any pore having a width of 3 µm or less may be defined as an internal pore. Each of the internal porosities of the graphite particles (area of internal pore in cross section of each graphite particle×100/area of cross section of each graphite particle) is calculated from the area of the cross section of each of the graphite particles and the area of each of the internal pores in the cross section of each of the graphite particles, calculated. The internal porosities of the graphite particles A and B are average values with respect to ten graphite particles A and ten graphite particles B, respectively.

The graphite particles A and B are produced as follows, for example.

<Graphite Particles A (Internal Porosity: 8% to 20%)>

The graphite particles A having a desired size are obtained by, for example, pulverizing coke (precursor) serving as a main raw material, to a predetermined size, firing and graphitizing such a precursor pulverized, which is aggregated by a binder and then further pressure molded into a block, at a temperature of 2600° C. or more, and pulverizing and sieving a block molded product graphitized. The internal porosity can be here adjusted to 8% to 20% by the amount of a volatile component added to the block molded product. The D50 of the precursor pulverized is preferably in the range from 12 µm to 20 µm. When a portion of the binder added to the coke (precursor) volatilizes in firing, the binder can be used as a volatile component. Examples of such a binder include pitch.

<Graphite Particles B (Internal Porosity: 5% or Less>

The graphite particles B having a desired size are obtained by, for example, pulverizing coke (precursor) serving as a main raw material, to a predetermined size, firing and graphitizing such a precursor pulverized, which is aggregated by a binder, at a temperature of 2600° C. or more, and then sieving the resultant. The internal porosity can be here adjusted to 5% or less by the particle size of the precursor pulverized, the particle size of the precursor aggregated, and/or the like. The D50 of the precursor pulverized is preferably in the range from 12 µm to 20 µm. When the internal porosity is decreased in the range of 5% or less, the particle size of the precursor pulverized is preferably increased.

The graphite particles A and B for use in the present embodiment are, for example, natural graphite or artificial graphite without any particular limitation, and are preferably artificial graphite in view of, for example, easiness of adjustment of the internal porosity. The plane spacing ($d_{002}$) of the (002) plane with respect to the graphite particles A and B for use in the present embodiment, according to a wide-angle X-ray diffraction method, is, for example, preferably 0.3354 nm or more, more preferably 0.3357 nm or more, and preferably less than 0.340 nm, more preferably 0.338 nm or less. The crystallite size (Lc(002)) with respect to the graphite particles A and B for use in the present embodiment, as determined according to an X-ray diffraction method, is, for example, preferably 5 nm or more, more preferably 10 nm or more, and preferably 300 nm or less, more preferably 200 nm or less. When the plane spacing ($d_{002}$) and the crystallite size (Lc(002)) satisfy the above respective ranges, the battery capacity of the non-aqueous electrolyte secondary battery tends to increase as compared with when the above respective ranges are not satisfied.

In the present embodiment, the graphite particles A are more included in a half second region 42B on the outer surface side than in a half first region 42A on the negative electrode current collector side in the case of bisection of the negative electrode active material layer 42 shown in FIG. 2 in the thickness direction. This enables not only suppression of deterioration in reactivity of the negative electrode 12, but also an increase in diffusion path of an electrolyte in the first region 42A where such an electrolyte is hardly permeated. Thus, an increase in resistance under a low-temperature environment is suppressed and low-temperature characteristics of the battery are enhanced. Herein, the bisection of the negative electrode active material layer 42 in the thickness direction means division into halves at the midpoint Z of the thickness of the negative electrode active material layer 42 under the assumption that the direction of stacking of the negative electrode current collector 40 and the negative electrode active material layer 42 is the thickness direction of the negative electrode active material layer 42. Any negative electrode active material layer 42 located closer when viewed from the negative electrode current collector 40 and any negative electrode active material layer 42 located farther when viewed from the negative electrode current collector 40, in the bisection of the negative electrode active material layer 42 in the thickness direction, are defined as the half first region 42A on the negative electrode current collector side and the half second region 42B on the outer surface side, respectively.

The graphite particles A may be more included in the second region 42B than in the first region 42A, or may be included in only the second region 42B. The graphite particles B are preferably more included in the first region 42A than in the second region 42B and may be included in only the first region 42A, in view of more suppression of an increase in resistance under a low-temperature environment. In other words, the content rate of the graphite particles A satisfies first region 42A<second region 42B, and the content rate of the graphite particles B satisfies first region 42A>second region 42B.

The mass ratio between the graphite particles A and the graphite particles B in the second region 42B is preferably 50:50 to 100:0, more preferably 75:25 to 100:0. The mass ratio between the graphite particles A and the graphite particles B in the first region 42A is preferably 25:75 to 0:100, more preferably 10:90 to 0:100.

A specific method for allowing the amount of the graphite particles A to be larger in the second region 42B than in the first region 42A is described. For example, first, a negative electrode active material including the graphite particles B (if necessary, graphite particles A), a binder, and a solvent such as water are mixed to prepare a negative electrode mixture slurry for use in the first region. A negative electrode active material including a larger amount of the graphite particles A (if necessary, graphite particles B) than that in the negative electrode mixture slurry for use in the first region, a binder, and a solvent such as water are mixed to separately prepare a negative electrode mixture slurry for use in the second region. Both sides of the negative electrode current collector can be coated with the negative electrode mixture slurry for use in the first region, the resultant coatings can be dried, thereafter both sides of a coating of the negative electrode mixture slurry for use in the first region can be coated with the negative electrode mixture slurry for use in the second region, and the resultant coatings can be dried, to thereby form the negative electrode active material layer 42. The method, while involves coating with the negative electrode mixture slurry for use in the second region after coating with the negative electrode mixture slurry for use in the first region, and drying, may be a method involving coating with the negative electrode mixture slurry for use in the second region after coating with the negative electrode mixture slurry for use in the first region and before drying.

The negative electrode active material may include other material that can reversibly intercalate and deintercalate lithium ions, other than the graphite particles A and B for use in the present embodiment, and may include, for example, a Si material. Examples of the Si material include Si, an alloy including Si, and silicon oxide such as SiOx (x is 0.8 to 1.6). The Si material, although is a negative electrode material that can more enhance battery capacity than graphite particles, is large in volume expansion along with charge and discharge and thus is disadvantageous in view of cycle characteristics. The content of the Si material is, for example, preferably 1 mass % to 10 mass %, more preferably 3 mass % to 7 mass % based on the mass of the negative electrode active material in view of, for example, an enhancement in battery capacity and suppression of deterioration in cycle characteristics.

Examples of such other material that can reversibly intercalate and deintercalate lithium ions include a metal to be alloyed with lithium, such as tin (Sn), or an alloy or oxide including a metal element such as Sn. The negative electrode active material may include such other material, and the content of such other material is, for example, 10 mass % or less based on the mass of the negative electrode active material.

Examples of the binder include fluoro resins, PAN, polyimide resins, acrylic resins, polyolefin resins, styrene-butadiene rubber (SBR), nitrile-butadiene rubber (NBR), carboxymethyl cellulose (CMC) or salts thereof, poly(acrylic acid) (PAA) or salts thereof (PAA-Na, PAA-K, and the like which may be partially neutralized salts), and poly(vinyl alcohol) (PVA). These may be used singly or may be used in combinations of two or more thereof

[Positive Electrode]

The positive electrode 11 is configured from, for example, a positive electrode current collector of metal foil or the like, and a positive electrode active material layer provided on a surface of the positive electrode current collector. The positive electrode current collector here used can be, for example, foil of a metal, such as aluminum, which is stable in the electric potential range of the positive electrode, or a film in which such a metal is disposed on an outer layer. The positive electrode active material layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, and drying the resultant to thereby form the positive electrode active material layer, and then rolling the positive electrode active material layer.

Examples of the positive electrode active material can include a lithium-containing transition metal composite oxide containing a transition metal element such as Co, Mn, or Ni. Examples of the lithium-containing transition metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or a plurality thereof may be mixed and used. The positive electrode active material preferably includes a lithium/nickel complex oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint that the capacity of the non-aqueous electrolyte secondary battery can be increased.

Examples of the conductive agent include carbon particles such as carbon black (CB), acetylene black (AB), Ketjenblack, and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimide resins, acrylic resins, and polyolefin resins. These may be used singly or may be used in combinations of two or more thereof

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of a separator to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, di phenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiCl, LiBr, LiI, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where l and m are integers of 1 or more}. These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

[Production of Positive Electrode]

A lithium-containing transition metal composite oxide represented by $LiNi_{0.91}Co_{0.45}Al_{0.45}O_2$ was used as a positive electrode active material. Mixed were 100 parts by mass of the positive electrode active material, 1 part by mass of graphite as a conductive agent, and 0.9 parts by mass of a poly(vinylidene fluoride) powder as a binder, and an appropriate amount of N-methyl-2-pyrrolidone (NMP) was further added thereto to prepare a positive electrode mixture slurry. Both sides of a positive electrode current collector made of aluminum foil (thickness 15 μm) were coated with the slurry by a doctor blade method, and the resultant coatings were dried and then rolled by a roller to thereby produce a positive electrode in which a positive electrode active material layer was formed on each of both sides of the positive electrode current collector. An exposed portion in which a current collector surface was exposed was disposed on the middle portion in the longitudinal direction of the positive electrode, and a positive electrode lead made of aluminum was attached to the exposed portion.

[Production of Graphite Particles A]

Coke was pulverized until the D50 reached 15 μm, pitch as a binder was added to the coke pulverized, the resultant was aggregated, and furthermore a block molded product having a density of 1.6 g/cm³ to 1.9 g/cm³ was then produced at isotropic pressure. The block molded product was fired and graphitized at a temperature of 2800° C. Then, the block molded product graphitized was pulverized and sieved using a 250-mesh sieve, to thereby obtain graphite particles A having a D50 of 23 μm.

[Production of Graphite Particles B]

Pitch as a binder was added to the coke pulverized, and the resultant was aggregated until the D50 reached 15 μm. After such an aggregate was fired and graphitized at a temperature of 2800° C., the resultant was sieved using a 250-mesh sieve, to thereby obtain graphite particles B having a D50 of 17 μm.

[Production of Negative Electrode]

Mixed were 95 parts by mass of graphite particles A and 5 parts by mass of particles of a Si-containing compound represented by SiO, in which Si particles were dispersed in $SiO_2$, and the resulting mixture was adopted as negative electrode active material A to be included in the half second region of the negative electrode active material layer on the outer surface side. Negative electrode active material A, carboxymethyl cellulose (CMC), and styrene-butadiene copolymer rubber (SBR) were mixed such that the mass ratio thereof was 100:1:1, to thereby prepare negative electrode mixture slurry A. Mixed were 95 parts by mass of graphite particles B and 5 parts by mass of SiO, and the resulting mixture was adopted as negative electrode active material B to be included in the half first region of the negative electrode active material layer on the negative electrode current collector side. Negative electrode active material B, carboxymethyl cellulose (CMC), and styrene-butadiene copolymer rubber (SBR) were mixed such that the mass ratio thereof was 100:1:1, to thereby prepare negative electrode mixture slurry B.

After both sides of a negative electrode current collector made of copper foil were coated with negative electrode mixture slurry B by a doctor blade method, and the resulting coatings were dried, the coatings were coated with negative electrode mixture slurry A, the resultant coatings were dried, and the coatings were then rolled by a roller to thereby produce a negative electrode in which a negative electrode active material layer was formed on each of both sides of the negative electrode current collector. In other words, the mass ratio of graphite particles A:graphite particles B in the second region of the negative electrode active material layer was 100:0, and the mass ratio of graphite particles A:graphite particles B in the first region of the negative electrode active material layer was 0:100. The internal porosities of the graphite particles A and B in the negative electrode produced were measured, and were 15% and 3%, respectively. The measurement method was as described above, and thus the description thereof was omitted. An exposed portion in which a current collector surface was exposed was disposed at one end in the longitudinal direction of the negative electrode, and a negative electrode lead made of nickel/copper/nickel was attached to the exposed portion.

[Preparation of Non-Aqueous Electrolyte Solution]

Vinylene carbonate (VC) was added at a concentration of 5% by mass to a non-aqueous solvent obtained by mixing ethylene carbonate (EC), ethyl methyl carbonate (EMC) and dimethyl carbonate (DMC) in a volume ratio of 4:1:15, and LiPF$_6$ was dissolved therein at a concentration of 1.35 mol/L, to thereby prepare a non-aqueous electrolyte solution.

[Production of Cylindrical Battery]

A wound-type electrode assembly was produced by spirally winding the positive electrode and the negative electrode with a polyethylene separator being interposed therebetween. Respective insulating plates were disposed on and under the electrode assembly, the negative electrode lead was welded to the inner surface of the bottom of an exterior can, and the positive electrode lead was welded to the sealing assembly, to thereby house the electrode assembly in the exterior can. Thereafter, the non-aqueous electrolyte solution was injected into the exterior can, the opening of the exterior can was sealed by the sealing assembly via a gasket, to thereby produce a cylindrical battery. The capacity of the battery was 4700 mAh.

Example 2

A negative electrode was produced in the same manner as in Example 1 except that 95 parts by mass of a mixture of graphite particles A and graphite particles B at a mass ratio of 75:25, and 5 parts by mass of SiO were mixed and the resulting mixture was used as negative electrode active material A. In other words, the mass ratio of graphite particles A:graphite particles B in the second region of the negative electrode active material layer was 75:25. A cylindrical battery was produced using the resultant negative electrode of Example 2 in the same manner as in Example 1.

Example 3

A negative electrode was produced in the same manner as in Example 1 except that 95 parts by mass of a mixture of graphite particles A and graphite particles B at a mass ratio of 25:75, and 5 parts by mass of SiO were mixed and the resulting mixture was used as negative electrode active material B. In other words, the mass ratio of graphite particles A: graphite particles B in the first region of the negative electrode active material layer was 25:75. A cylindrical battery was produced using the resultant negative electrode of Example 3 in the same manner as in Example 1.

Comparative Example 1

A negative electrode and a cylindrical battery were produced in the same manner as in Example 1 except that a negative electrode active material layer in which the mass ratio of graphite particles A: graphite particles B in the second region was 0:100 and the mass ratio of graphite particles A: graphite particles B in the first region was 100:0 was formed by forming coatings with negative electrode mixture slurry A on both sides of the negative electrode current collector and then forming coatings with negative electrode mixture slurry B thereon.

Comparative Example 2

A negative electrode and a cylindrical battery were produced in the same manner as in Example 1 except that 95 parts by mass of a mixture of graphite particles A and graphite particles B at a mass ratio of 50:50, and 5 parts by mass of SiO were mixed and the resulting mixture was used as each of negative electrode active materials A and B.

Comparative Example 3

A negative electrode and a cylindrical battery were produced in the same manner as in Example 1 except that a negative electrode active material layer was formed by using only negative electrode mixture slurry A.

Comparative Example 4

A negative electrode and a cylindrical battery were produced in the same manner as in Example 1 except that a negative electrode active material layer was formed by using only negative electrode mixture slurry B.

[Evaluation of Low-Temperature Characteristics]

Each of the batteries of Examples and Comparative Examples was charged to a battery voltage of 3.54 V at a constant current of 0.3 C (1 C=4700 mA) and then discharged to 1/50 C at a constant voltage at 25° C. After 2 hours of rest under an environment at −20° C., charge and discharge were each made under a condition of 0.3 C to measure the direct current resistance (DCR), and the evaluation results were shown in Table 1.

DCR(Ω)=(Voltage after 10 seconds−Initial voltage)/Current

TABLE 1

| | Graphite particles in negative electrode active material layer | | Evaluation of low-temperature characteristics | |
|---|---|---|---|---|
| | Second region | First region | Charge DCR | Discharge DCR |
| Example 1 | Graphite A:Graphite B = 100:0 | Graphite A:Graphite B = 0:100 | 1.01Ω | 0.63Ω |
| Example 2 | Graphite A:Graphite B = 75:25 | Graphite A:Graphite B = 0:100 | 1.05Ω | 0.67Ω |
| Example 3 | Graphite A:Graphite B = 100:0 | Graphite A:Graphite B = 25:75 | 1.09Ω | 0.70Ω |
| Comparative Example 1 | Graphite A:Graphite B = 0:100 | Graphite A:Graphite B = 100:0 | 1.32Ω | 0.78Ω |
| Comparative Example 2 | Graphite A:Graphite B = 50:50 | Graphite A:Graphite B = 50:50 | 1.34Ω | 1.01Ω |

TABLE 1-continued

| | Graphite particles in negative electrode active material layer | | Evaluation of low-temperature characteristics | |
|---|---|---|---|---|
| | | | Charge DCR | Discharge DCR |
| | Second region | First region | | |
| Comparative Example 3 | Graphite A:Graphite B = 100:0 | Graphite A:Graphite B = 100:0 | 1.10Ω | 0.70Ω |
| Comparative Example 4 | Graphite A:Graphite B = 0:100 | Graphite A:Graphite B = 0:100 | 1.37Ω | 0.85Ω |

As clear from Table 1, the batteries of Examples each exhibited a low value of low-temperature DCR as compared with the batteries of Comparative Examples. It was considered that the batteries of Examples, in which graphite particles A were more present in the second region of the negative electrode active material layer, the region being in contact with an electrolyte, and graphite particles B were more present in the first region where an electrolyte was hardly permeated, thus not only were suppressed in deterioration in reactivity of the negative electrode, but also could result in an increase in diffusion path of an electrolyte solution in the first region, thereby leading to suppression of an increase in resistance.

It was considered that the batteries of Comparative Examples 1 and 2 were each deteriorated in reactivity of a negative electrode and allowed for no sufficient formation of any diffusion path of an electrolyte solution in the first region of the negative electrode active material layer, resulting in an increase in low-temperature DCR. It was considered that the battery of Comparative Example 3 allowed for no sufficient formation of any diffusion path of an electrolyte solution in the first region of the negative electrode active material layer and the battery of Comparative Example 4 was deteriorated in reactivity of the negative electrode, thereby leading to an increase in low-temperature DCR.

REFERENCE SIGNS LIST

10 non-aqueous electrolyte secondary battery, 11 positive electrode, 12 negative electrode, 13 separator, 14 electrode assembly, 16 exterior can, 17 sealing assembly, 18, 19 insulating plate, 20 positive electrode lead, 21 negative electrode lead, 22 grooved portion, 23 internal terminal plate, 24 lower vent member, 25 insulating member, 26 upper vent member, 27 cap, 28 gasket, 30 graphite particle, 34 internal pore, 36 external pore, 40 negative electrode current collector, 42 negative electrode active material layer, 42A first region, 42B second region

The invention claimed is:

1. A non-aqueous electrolyte secondary battery comprising:
    a negative electrode including a negative electrode current collector and a negative electrode active material layer disposed on the negative electrode current collector; wherein
    the negative electrode active material layer includes graphite particles A and graphite particles B each as a negative electrode active material,
    the graphite particles A have an internal porosity of 8% to 20% and the graphite particles B have an internal porosity of 5% or less, and
    the graphite particles A are more included in a half second region on an outer surface side than in a half first region on a negative electrode current collector side in the case of bisection of the negative electrode active material layer in a thickness direction.

2. The non-aqueous electrolyte secondary battery according to claim 1, wherein the graphite particles B are more included in the first region than in the second region.

3. The non-aqueous electrolyte secondary battery according to claim 1, wherein a mass ratio between the graphite particles A and the graphite particles B in the second region is 75:25 to 100:0.

4. The non-aqueous electrolyte secondary battery according to claim 1, wherein the negative electrode active material includes a Si material.

* * * * *